H. H. WACHTER.
PLOW COLTER.
APPLICATION FILED JUNE 24, 1908.
901,759.
Patented Oct. 20, 1908.
Fig. 1.
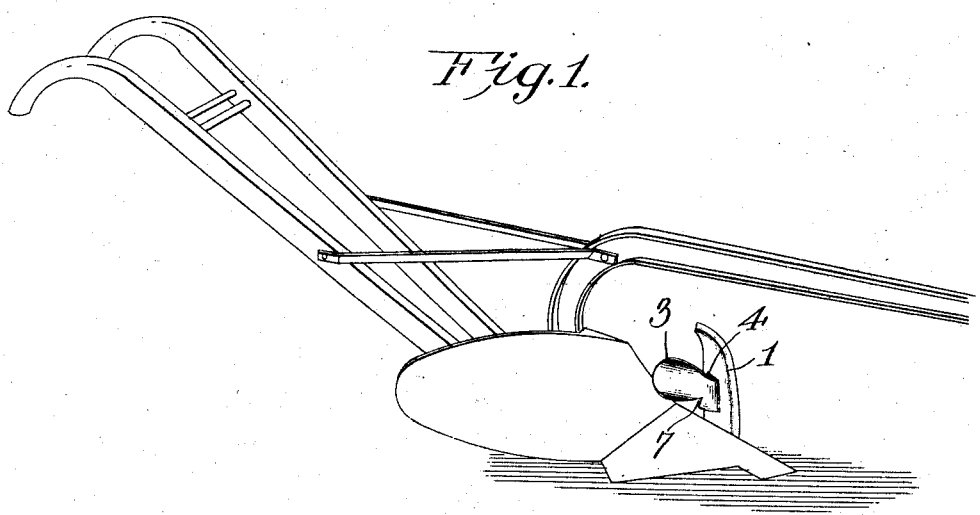
Fig. 2.
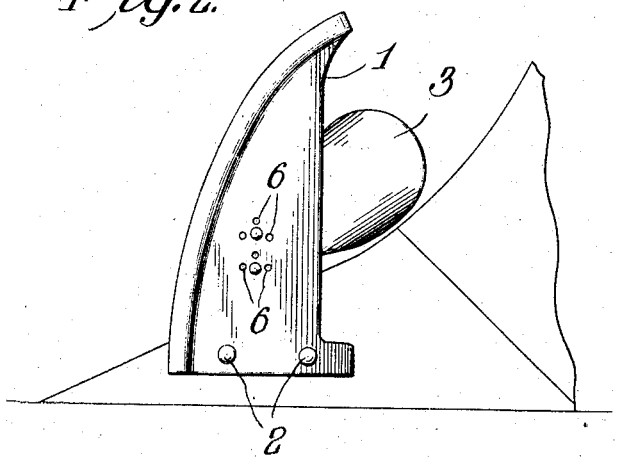
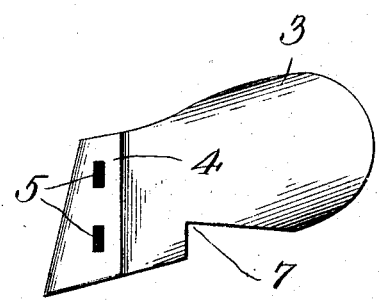
Fig. 3.
Fig. 4.
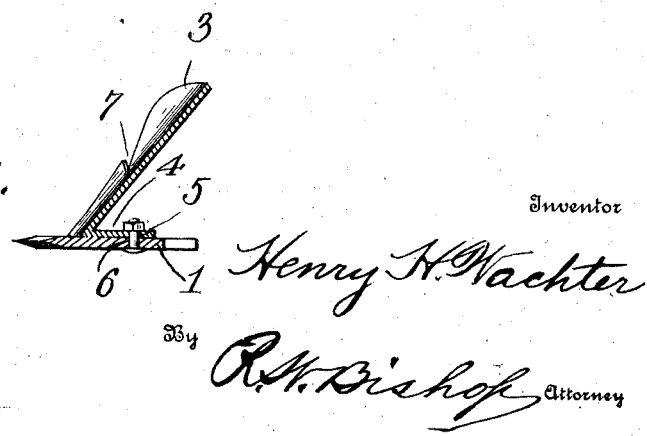
Witnesses
C. E. Smith.
C. D. Davis
Inventor
Henry H. Wachter
By R. W. Bishop, Attorney
THE NORRIS PETERS CO., WASHINGTON, D. C.

UNITED STATES PATENT OFFICE.

HENRY H. WACHTER, OF MELROSE, WISCONSIN.

PLOW-COLTER.

No. 901,759.     Specification of Letters Patent.     Patented Oct. 20, 1908.

Application filed June 24, 1908. Serial No. 440,104.

*To all whom it may concern:*

Be it known that I, HENRY H. WACHTER, a citizen of the United States of America, residing at Melrose, in the county of Jackson and State of Wisconsin, have invented certain new and useful Improvements in Plow-Colters, of which the following is such a full, clear, and exact description as will enable others skilled in the art to which it appertains to make and use the same.

This invention relates generally to plow attachments and particularly to colters and jointers attached to the plowshare for the purpose of cutting roots and stubble encountered in the path of the plow and turning the corner of the furrow so as to leave the ground clear and the earth mellow after plowing.

The invention consists in certain novel features hereinafter first fully described and then particularly pointed out in the claims.

In the annexed drawings, which fully illustrate the invention, Figure 1 is a perspective view of my improved device in its operative position. Fig. 2 is an elevation looking at the side away from the moldboard, and Fig. 3 is a detail elevation of the end of the moldboard of the device. Fig. 4 is a horizontal section.

In carrying out my invention, I employ a plate or blade, 1, having openings, 2, near its lower edge through which suitable bolts may be inserted into the landside of the plowshare to secure the plate thereto in a vertical position. The front or cutting edge of the blade extends upward and then slightly rearward in a convex curve and the end of the blade is short of the plow beam, as shown. Just above the surface of the plowshare and projecting a short distance across the plane of the moldboard is a supplemental moldboard, 3, which is provided with a rearwardly turned flange, 4, at one end constructed with slots, 5, through which and openings, 6, in the blade are inserted suitable bolts to adjustably secure the supplemental moldboard to the blade. The moldboard extends obliquely to the rear from the blade and its front face is concave while in its lower edge is formed a substantially triangular notch, 7, one wall of which is at a right angle to the lower edge of the moldboard.

The plow equipped with my improved colter is drawn through the ground in the usual manner. The blade being constructed of stout steel and having its front edge sharpened will cut through the ground and sever any roots which may be encountered while the supplemental moldboard turns a three-cornered furrow (by reason of the triangular notch in its edge,) covering up all stubble and weeds so that the ground will be clean when plowed. When working in sod, the supplemental moldboard cuts off the corner and turns it into the bottom of the furrow so that the ground will be in a very mellow condition.

The draft of the plow is not increased by my attachment but is rather lessened as the vertical blade cuts through and opens the ground and the supplemental moldboard turns a furrow so that the work of opening up the ground by the plow share is materially reduced.

As the attachment is not attached to the beam of the plow but is secured to the landside of the plowshare by only two bolts, the cost of the device is very slight and it can be readily fastened in its operative position by any one in a few minutes.

As the cut is from the bottom toward the top, the draft of the device is not excessive and as the blade terminates short of the beam any heavy stubble or stalks which are now generally burned will slide over the top of the colter and be dropped in the main furrow to fertilize the ground. There is no clogging of the plow and consequently no stopping of the team and no loss of time.

Having thus described my invention, what I claim and desire to secure by Letters-Patent is:—

1. An attachment for plows consisting of a blade constructed at one end to be attached to and supported solely by the landside of a plowshare, and a moldboard projecting from the said blade.

2. An attachment for plows consisting of a vertically disposed blade arranged to be secured at its lower end to the landside of a plowshare and having a front cutting edge, and a moldboard projecting laterally from the blade.

3. An attachment for plows consisting of a vertically-disposed blade having a convex front cutting edge, and a moldboard adjustably secured to said blade and projecting laterally therefrom.

4. An attachment for plows consisting of a blade, and a moldboard projecting laterally from the blade and having a triangular notch in its lower edge.

5. The combination with a plow, of a vertically-disposed blade secured at its lower end to the landside of a plowshare and having its upper end short of the plow beam, and a moldboard projecting from the blade.

6. An attachment for plows consisting of a blade having a plurality of openings therein, a moldboard having a rearwardly turned flange at its inner end provided with slots, and fastening bolts inserted through the said slots and the openings in the blade.

In testimony whereof, I have signed this specification in the presence of two subscribing witnesses.

HENRY H. WACHTER.

Witnesses:
J. A. ANDERSON,
T. R. BARTLETT.